US010878417B2

(12) United States Patent
Li

(10) Patent No.: US 10,878,417 B2
(45) Date of Patent: Dec. 29, 2020

(54) METHOD AND APPARATUS FOR CONSENSUS VERIFICATION

(71) Applicant: ALIBABA GROUP HOLDING LIMITED, Grand Cayman (KY)

(72) Inventor: Ning Li, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/752,323

(22) Filed: Jan. 24, 2020

(65) Prior Publication Data

US 2020/0160336 A1    May 21, 2020

Related U.S. Application Data

(63) Continuation of application No. 15/927,337, filed on Mar. 21, 2018.

(30) Foreign Application Priority Data

Mar. 24, 2017   (CN) .......................... 2017 1 0181068

(51) Int. Cl.
*G06Q 20/40*   (2012.01)
*G06Q 20/38*   (2012.01)
(Continued)

(52) U.S. Cl.
CPC ....... *G06Q 20/401* (2013.01); *G06Q 20/3823* (2013.01); *G06Q 20/3825* (2013.01);
(Continued)

(58) Field of Classification Search
None
See application file for complete search history.

(56) References Cited

U.S. PATENT DOCUMENTS 9,998,286  B1    6/2018  Ramathal et al.
10,579,974 B1 *  3/2020  Reed .................... G06Q 20/065
(Continued)

FOREIGN PATENT DOCUMENTS

CN    105488665 A    4/2016
CN    105719172 A    6/2016
(Continued)

OTHER PUBLICATIONS

Antomopoulos, Mining and Consensus, Dec. 20, 2014 (41 Pages).
(Continued)

*Primary Examiner* — Neha Patel
*Assistant Examiner* — Clay C Lee

(57) ABSTRACT

A method for consensus verification implementable by a first blockchain node in a consensus network may comprise: receiving a transaction request from a client, and performing a first security verification on the transaction request; in response to determining that the transaction request passes the first security verification, storing the transaction request, and broadcasting the transaction request to each of second blockchain nodes in the consensus network, causing the each second blockchain node to store the transaction request in response to the second blockchain node determining that the transaction request passes a second security verification; performing pre-processing on at least one stored transaction request in response to determining that a preset condition is satisfied, to obtain and store a pre-processed block; and broadcasting the obtained pre-processed block to the second blockchain nodes, causing the second blockchain nodes to perform consensus verification on the obtained pre-processed block.

17 Claims, 6 Drawing Sheets

(51) Int. Cl.
*H04L 9/06* (2006.01)
*H04L 29/08* (2006.01)

(52) U.S. Cl.
CPC ..... *G06Q 20/38215* (2013.01); *H04L 9/0637* (2013.01); *H04L 9/0643* (2013.01); *G06Q 2220/00* (2013.01); *H04L 67/1004* (2013.01)

(56) References Cited

U.S. PATENT DOCUMENTS

| | | |
|---|---|---|
| 2016/0028552 A1 | 1/2016 | Spanos et al. |
| 2016/0098723 A1* | 4/2016 | Feeney ................ G06Q 20/065 705/75 |
| 2016/0162897 A1* | 6/2016 | Feeney ................ G06Q 20/065 705/71 |
| 2016/0224949 A1 | 8/2016 | Thomas et al. |
| 2016/0321654 A1 | 11/2016 | Lesavich et al. |
| 2016/0342988 A1 | 11/2016 | Thomas et al. |
| 2016/0358135 A1 | 12/2016 | Liao et al. |
| 2017/0061398 A1 | 3/2017 | Joseph |
| 2017/0083598 A1 | 3/2017 | Guney et al. |
| 2017/0083860 A1 | 3/2017 | Sriram et al. |
| 2017/0103468 A1 | 4/2017 | Orsini et al. |
| 2017/0140394 A1 | 5/2017 | Cao et al. |
| 2017/0344987 A1 | 11/2017 | Davis |
| 2018/0101560 A1 | 4/2018 | Christidis et al. |
| 2018/0123882 A1 | 5/2018 | Anderson et al. |
| 2018/0150835 A1 | 5/2018 | Hunt et al. |
| 2018/0152289 A1 | 5/2018 | Hunt et al. |
| 2018/0157558 A1 | 6/2018 | Karame et al. |
| 2018/0158034 A1* | 6/2018 | Hunt ..................... G06Q 20/027 |
| 2018/0165476 A1 | 6/2018 | Carey et al. |
| 2018/0205537 A1 | 7/2018 | Wilson et al. |
| 2018/0260212 A1* | 9/2018 | Wisnovsky ........... H04L 9/3236 |

FOREIGN PATENT DOCUMENTS

| | | |
|---|---|---|
| CN | 105956923 A | 9/2016 |
| CN | 105976232 A | 9/2016 |
| CN | 106060036 A | 10/2016 |
| CN | 106130738 A | 11/2016 |
| CN | 106301792 A | 1/2017 |
| CN | 106384236 A | 2/2017 |
| CN | 106411503 A | 2/2017 |
| CN | 106445711 A | 2/2017 |
| CN | 106452785 A | 2/2017 |
| EA | 004078 B1 | 12/2003 |
| TW | 201618004 A | 5/2016 |
| WO | 2017/006135 A1 | 1/2017 |

OTHER PUBLICATIONS

Nakamoto, Bitcoin: A Peer-to-Peer Electronic Cash System, Oct. 31, 2008 (9 Pages).
First Office Action of Chinese Application No. 201710181068.8 dated Dec. 3, 2019 (18 Pages).
First Search of Chinese Application No. 201710181068.8 dated Nov. 25, 2019 (1 Page).
Written Opinion of the International Preliminary Examining Authority for Application No. PCT/US2018/023503, dated Mar. 13, 2019, 7 pages.
International Preliminary Report on Patentability for PCT Application No. PCT/US2018/023503, dated Jul. 19, 2019, 22 pages.
Office Action and Search Report for Taiwan Application No. 106139125, dated Apr. 9, 2019, 16 pages.
Office Action and Search Report for Taiwan Application No. 106139125, dated Aug. 15, 2019, 12 pages.
International Search Report and Written Opinion for Application No. PCT/US2018/023503, dated May 30, 2018, 15 pages.
Antonopoulos, Andreas M. "Mastering Bitcoin—Unlocking Digital Cryptocurrencies," O'Reilly Media, Beijing Cambridge Farnham Koln Sepastapol, Tokyo, Dec. 2014, XP055306939, p. 18-20, 24-28 and 180-181.
Nakamoto, Satoshi. "Bitcoin: A Peer-to-Peer Electronic Cash System," Oct. 2008, XP044131503, 9 pages, retrieved from https://bitcoin.org/bitcoin.pdf.
Piscini, Eric et al., "Blockchain: Democratized Trust," Tech Trends 2016 Innovating in the Digital Era, Feb. 2016, p. 80-95, retrieved from https://www2.deloitte.com/content/dam/insights/us/articles/blockchain-applications-and-trust-in-a-global-economy/DUP_TechTrends2016.pdf.
Examination Report No. 1 for Australian Patent Application No. 2018240272 dated Jan. 15, 2020.
Office Action and Search Report for Russian Application No. 2019127061 dated Apr. 23, 2020.
Non-Final Rejection for U.S. Appl. No. 15/927,337 dated Apr. 22, 2020.
Written Opinion for Singaporean Application No. 11201907842X dated Aug. 13, 2020.

* cited by examiner

METHOD AND APPARATUS FOR CONSENSUS VERIFICATION

CROSS-REFERENCE TO RELATED APPLICATIONS

The present application is a continuation of U.S. patent application Ser. No. 15/927,337 filed on Mar. 21, 2018, entitled "Method and Apparatus for Consensus Verification," which is based on and claims priority to the Chinese Application No. 201710181068.8, filed Mar. 24, 2017, each of which is incorporated herein by reference in its entirety.

TECHNICAL FIELD

The present application relates to the field of computer technologies, and in particular, to methods and apparatuses for consensus verification.

BACKGROUND

The blockchain technology can make data stored in a blockchain unchangeable and decentralized, and thus has attracted attention since its emergence. Along with increasingly in-depth research on the blockchain technology, a more secure data storage environment has been realized with the blockchain technology, and moreover, the blockchain technology has been used to achieve optimization of a variety of services, such as transaction services.

At present, upon receiving a transaction request sent by a client, a blockchain node will store the transaction request in itself. At the same time, the blockchain node will further broadcast the transaction request to the other blockchain nodes in the consensus network, and the other blockchain nodes will correspondingly store the received transaction request in themselves.

In the consensus verification phase, a blockchain node first needs to obtain a plurality of transaction requests from the transaction requests stored therein, and performs asymmetric signature legality verification on these transaction requests. When it is determined that these transaction requests pass the asymmetric signature legality verification, the blockchain node packages these transaction requests into a pre-processed block and broadcasts it to other blockchain nodes in the entire consensus network. Upon receiving the pre-processed block, the other blockchain nodes first perform asymmetric signature legality verification on all the transaction requests comprised in the pre-processed block, and when it is determined that these transaction requests pass the asymmetric signature legality verification, perform consensus verification on these transaction requests to determine whether it is necessary to store these transaction requests in the form of a block in the blockchain.

As shown in the above process, in the consensus verification phase, a blockchain node needs to perform relatively complex processing on to-be-consensused transaction requests before it can package these transaction requests into a pre-processed block and broadcast it to other blockchain nodes in the consensus network. Other blockchain nodes also need to perform processes on the pre-processed block before they can perform consensus verification on the transaction requests comprised in the pre-processed block. According to the prior art, therefore, the process involved in the consensus phase is relatively complicated, and the consensus process takes too much time, which consequently lowers the efficiency of consensus verification in blockchain transactions.

SUMMARY

Embodiments of the present application provide exemplary systems and methods for consensus verification to at least mitigate the low efficiency consensus verification in blockchain transactions in prior art.

According to one aspect, a method for consensus verification implementable by a first blockchain node in a consensus network may comprise: receiving a transaction request from a client, and performing a first security verification on the transaction request; in response to determining that the transaction request passes the first security verification, storing the transaction request, and broadcasting the transaction request to each of second blockchain nodes in the consensus network, causing the each second blockchain node to store the transaction request in response to the second blockchain node determining that the transaction request passes a second security verification; performing pre-processing on at least one stored transaction request in response to determining that a preset condition is satisfied, to obtain and store a pre-processed block; and broadcasting the obtained pre-processed block to the second blockchain nodes, causing the second blockchain nodes to perform consensus verification on the obtained pre-processed block.

According to another aspect, a method for consensus verification implementable by a second blockchain node may comprise: receiving a transaction request broadcast by a first blockchain node, and performing a second security verification on the transaction request; in response to determining that the transaction request passes the second security verification, storing the transaction request; and in response to receiving a pre-processed block broadcast by the first blockchain node, performing consensus verification on the pre-processed block.

Embodiments of the present application provide an apparatus for consensus verification, comprising: a receiving module configured to receive a transaction request from a client, and perform a first security verification on the transaction request; a storing module configured to store, when determining that the transaction request passes the first security verification, the transaction request, and broadcast the transaction request to each second blockchain node, such that the each second blockchain node stores the transaction request when determining that the transaction request passes a second security verification; a pre-processing module configured to perform pre-processing on at least one stored transaction request when determining that a preset condition is satisfied, to obtain and store a pre-processed block; a grabbing module configured to grab, when carrying out consensus verification, a pre-processed block and broadcast it to all second blockchain nodes in the consensus network, to perform consensus verification on the grabbed pre-processed block through all the second blockchain nodes.

According to another aspect, an apparatus in a consensus network for consensus verification may comprise a processor and a non-transitory computer-readable storage medium storing instructions that, when executed by the processor, cause the apparatus to perform a method. The method may comprise: receiving a transaction request from a client, and performing a first security verification on the transaction request; in response to determining that the transaction request passes the first security verification, storing the transaction request, and broadcasting the transaction request to each second blockchain nodes in the consensus network, causing the each second blockchain node to store the transaction request in response to the second blockchain node determining that the transaction request passes a second security verification; performing pre-processing on at least one stored transaction request in response to determining that a preset condition is satisfied, to obtain and store a pre-processed block; and broadcasting the obtained pre-processed block to the second blockchain nodes, causing the second blockchain nodes to perform consensus verification on the obtained pre-processed block.

According to another aspect, a first blockchain node in a consensus network may comprise a plurality of the apparatuses and at least one transaction memory. The each apparatus may comprise a processor and a non-transitory computer-readable storage medium storing instructions that, when executed by the processor, cause the apparatus to perform a method. The method may comprise: receiving a transaction request from a client, and performing a first security verification on the transaction request; in response to determining that the transaction request passes the first security verification, storing the transaction request, and broadcasting the transaction request to each second blockchain nodes in the consensus network, causing the each second blockchain node to store the transaction request in response to the second blockchain node determining that the transaction request passes a second security verification; performing pre-processing on at least one stored transaction request in response to determining that a preset condition is satisfied, to obtain and store a pre-processed block; and broadcasting the obtained pre-processed block to the second blockchain nodes, causing the second blockchain nodes to perform consensus verification on the obtained pre-processed block.

According to another aspect, an apparatus for consensus verification may comprise a processor and a non-transitory computer-readable storage medium storing instructions that, when executed by the processor, cause the apparatus to perform a method. The method may comprise: receiving a transaction request broadcast by a first blockchain node, and performing a second security verification on the transaction request; storing, in response to determining that the transaction request passes the second security verification, the transaction request; and performing consensus verification, in response to receiving a pre-processed block broadcast by the first blockchain node, on the pre-processed block.

According to another aspect, a second blockchain node may comprise a plurality of the apparatuses and at least one transaction memory. The each apparatus may comprise a processor and a non-transitory computer-readable storage medium storing instructions that, when executed by the processor, cause the apparatus to perform a method. The method may comprise: receiving a transaction request broadcast by a first blockchain node, and performing a second security verification on the transaction request; storing, in response to determining that the transaction request passes the second security verification, the transaction request; and performing consensus verification, in response to receiving a pre-processed block broadcast by the first blockchain node, on the pre-processed block.

Embodiments of the present application provide an apparatus for consensus verification, comprising: a request receiving module configured to receive a transaction request broadcast by a first blockchain node, and perform a second security verification on the transaction request; a request storing module configured to store, when determining that the transaction request passes the second security verification, the transaction request; a verifying module configured to perform consensus verification, when receiving a pre-processed block broadcast by the first blockchain node, on the pre-processed block.

In some embodiments of the present disclosure, upon receiving a transaction request from a client, a first blockchain node may perform a first security verification on the transaction request, instead of waiting for the consensus verification phase to perform a first security verification on the transaction request, which greatly simplifies the consensus verification. Moreover, before the consensus verification phase, the first blockchain node can obtain at least one transaction request from the transaction requests stored in itself, and process the obtained transaction requests to obtain a pre-processed block. In this way, the first blockchain node can directly broadcast, in the consensus verification phase, the previously obtained pre-processed block to all second blockchain nodes in the consensus network, which greatly simplifies the process in the consensus verification phase, shortens the time consumed in the consensus verification phase, and improves the consensus efficiency for blockchain transactions.

BRIEF DESCRIPTION OF THE DRAWINGS

The accompanying drawings described herein are used to provide a further understanding of the present disclosure. The illustrative embodiments and description thereof are merely exemplary and do not limit the present disclosure. In the accompanying drawings.

DETAILED DESCRIPTION

Figure 1:
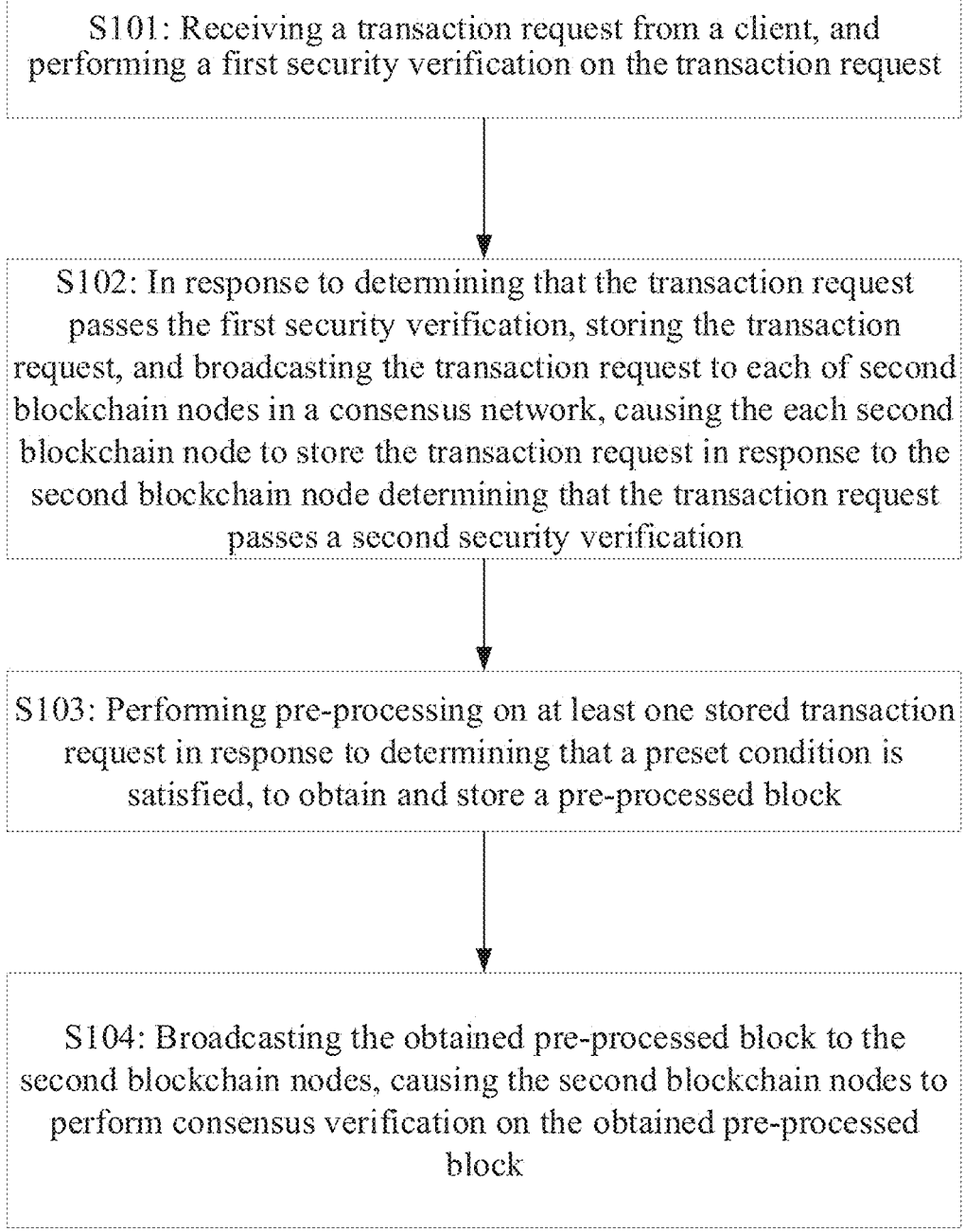
FIG. 1 is a schematic diagram of a consensus verification process according to an embodiment of the present disclosure.

At present, a process in which a blockchain node performs transaction processing is substantially as follows: a client sends a transaction request to a blockchain node, and the blockchain node sends the received transaction request, in a broadcasting form, to other blockchain nodes; and the other blockchain nodes store the received transaction request. The blockchain node that sends the transaction request to the other blockchain nodes also stores the transaction request in itself.

In a consensus network formed by blockchain nodes, each blockchain node has right to initiate a consensus request to other blockchain nodes. A blockchain node can sort transaction requests stored in itself in an order to obtain a transaction request queue and generate a Hash value for the transaction request queue. Subsequently, the blockchain node can package the transaction request queue and the Hash value into a pre-processed block, and sends the pre-processed block, in a broadcasting form, to other blockchain nodes for consensus verification.

In a consensus verification process, upon receiving the pre-processed block, the other blockchain nodes perform security verification, such as asymmetric signature legality verification, on all transaction requests comprised in the pre-processed block. For example, a blockchain node may resolve all transaction requests comprised in the pre-processed block according to a public key that it possesses, to verify whether each transaction request is a legal transaction request.

Furthermore, whenever a blockchain node receives a transaction request from a client, the blockchain node broadcasts the transaction request to other blockchain nodes, and therefore, each blockchain node may generally store in itself transaction requests received by the entire consensus network. On the basis of this, upon receiving the pre-processed block, the other blockchain nodes will perform Hash integrity verification on all transaction requests in the pre-processed block. Namely, a blockchain node can find transaction requests comprised in the pre-processed block from the transaction requests stored in itself, and sort the found transaction requests in a sequence that the transaction requests are arranged in the pre-processed block to obtain a transaction request queue. Subsequently, the blockchain node can generate a Hash value for the transaction request queue, and then compare the obtained Hash value with the Hash value comprised in the pre-processed block to determine whether the transaction requests in the pre-processed block have been altered.

According to the security verification and Hash integrity verification performed on the pre-processed block, each blockchain node will obtain its own verification result regarding whether the pre-processed block is legal as a whole and broadcast the verification result obtained by itself, in a broadcasting form, to other blockchain nodes.

According to the verification results sent by the other blockchain nodes and the verification result obtained by itself regarding the pre-processed block, each blockchain node will obtain comprehensive verification results by all blockchain nodes in the entire consensus network regarding whether the pre-processed block passes, and broadcast the obtained comprehensive verification result, in a broadcasting form again, to the other blockchain nodes.

Upon receiving the mutually broadcast comprehensive verification results, each blockchain node in the consensus network will further determine whether most of the comprehensive verification results obtained by all blockchain nodes in the consensus network are that the verification is passed. If yes, all transaction requests in the pre-processed block are stored in their own blockchains in the block form; if no, it is determined that the transaction requests in the pre-processed block do not pass the consensus verification.

According to the process above, when a blockchain node performs consensus verification on transaction requests according to the prior art, the consensus verification process is relatively complicated, and the consensus verification process takes too much time, which leads to a low transaction processing efficiency of blockchain transactions.

To effectively solve the above problem, a first blockchain node as disclosed can perform security verification and generate a pre-processed block prior to the consensus verification phase. In other words, the first blockchain node can perform at least a part of the process involved in the consensus verification phase of the prior art prior to the consensus verification phase, which greatly simplifies the consensus verification process, shortens the time consumed in the consensus verification phase, and improves the consensus verification efficiency for blockchain transactions.

The described embodiments herein are merely exemplary. All other embodiments obtainable by a person skilled in the art without inventive effort and on the basis of the embodiments shall be encompassed by the present disclosure.

FIG. 1 is a schematic diagram of a consensus verification process according to an embodiment of the present disclosure. The consensus verification process may be implementable by a first blockchain node and may comprise the following steps:

S101: receiving a transaction request from a client, and performing a first security verification on the transaction request.

In some embodiments, in a transaction processing process, a user may send a transaction request to a first blockchain node through a client installed in a terminal. For example, the user fills corresponding transaction processing contents in an interface presented at the client, the client generates a corresponding transaction request according to the transaction processing contents filled by the user in the interface, and then sends the transaction request to the first blockchain node via the terminal. The user may also fill corresponding transaction processing contents in a user terminal held by his/her own, while the terminal generates a corresponding transaction request according to the transaction processing contents filled by the user, and then sends the transaction request to the first blockchain nodes in the consensus network. Here, the terminal mentioned herein may be an apparatus like computer, tablet, smart phone, etc.

In some embodiments, a consensus network comprises a plurality of blockchain nodes, while the first blockchain node mentioned may refer to a blockchain node that receives a transaction request from a client. The blockchain nodes other than the first blockchain nodes may be referred to as second blockchain nodes. The first blockchain node and the second blockchain node are relative concepts. A blockchain node that receives a transaction request from a client may be a first blockchain node, while a blockchain node that receives the transaction request sent by the first blockchain node in a broadcasting form may be referred to as a second blockchain node. Since all blockchain nodes in a consensus network can receive a transaction request from a client, all blockchain nodes are substantially first blockchain nodes or second blockchain nodes. The difference between first blockchain node and second blockchain node may be dependent on from where a transaction request is received.

According to the prior art, when receiving a transaction request from a client, a first blockchain node usually stores the transaction request directly in itself. In this process, the first blockchain node does not perform any verification on the transaction request. On the other hand, a verification process is usually performed in the consensus verification phase. In a consensus verification process, all blockchain nodes in the consensus network first perform security verification, such as asymmetric signature legality verification, including RSA (Rivest-Shamir-Adleman cryptosystem) and the like, on all transaction requests comprised in a pre-processed block broadcast by the first blockchain node to verify whether the transaction requests comprised in the pre-processed block are legal. Subsequently, all blockchain nodes in the consensus network will verify the content of each transaction request. The verification may be carried out in the form of Hash integrity verification.

When the above two verifications are completed, the blockchain nodes in the consensus network will further perform consensus according to the verification results obtained after the verifications are performed on the pre-processed block, and then decide whether the transaction requests comprised in the pre-processed block can be written into the blockchain.

As such, in a consensus verification process, a consensus network needs to have three phases, including security verification, Hash integrity verification, and consensus of verification results, on all transaction requests comprised in the above pre-processed block. Due to these three phases, the consensus verification process according to the prior art takes too much time and consequently lowers the efficiency of consensus verification on blockchain transactions.

To effectively solve the above problem, in the present disclosure, the security verification in the consensus verification can be performed prior to the consensus verification, thereby simplifying the entire consensus verification process, improving the consensus verification efficiency, and then improving the transaction processing efficiency for blockchain transactions.

For example, upon receiving a transaction request from a client, a first blockchain node may perform a first security verification on the transaction request. In one embodiment, the first security verification may be asymmetric signature legality verification, while the asymmetric signature legality verification herein may be implemented through an asymmetric encryption algorithm, such as RSA encryption algorithm. Therefore, when the client sends the transaction request to the first blockchain node, the client can encrypt the transaction request through a private key held thereby, and the first blockchain node can, upon receiving the transaction request, resolve the transaction request through a public key held thereby and verify the resolved content.

In some embodiments, when the client sends the transaction request to the first blockchain node, it may send the public key for resolving the transaction request in the transaction request. Upon receiving the transaction request, the first blockchain node can resolve the transaction request according to the public key comprised in the transaction request. The first blockchain node can also acquire the public key from the client in advance. Correspondingly, when the client sends the transaction request to the first blockchain node, the first blockchain node can resolve the transaction request through the public key that is acquired in advance.

In some embodiments, the first security verification described above refers to a security verification performed by the first blockchain node on the above transaction request, and the second security verification described later refers to a security verification performed by a second blockchain node on the above transaction request. The verification manners adapted by the first security verification and the second security verification may be the same verification manner, e.g., asymmetric signature legality verification in both cases. Therefore, the first security verification described herein and the second security verification described later may be used to determine which blockchain node performs security verification on the above transaction request.

S102: in response to determining that the transaction request passes the first security verification, storing the transaction request, and broadcasting the transaction request to each second blockchain nodes in a consensus network, causing the each second blockchain node to store the transaction request in response to the second blockchain node determining that the transaction request passes a second security verification. The consensus network may comprise the first blockchain node and the second blockchain nodes.

When determining that the transaction request passes the first security verification, the first blockchain node can store the transaction request. When determining that the transaction request does not pass the first security verification, the first blockchain node does not store the transaction request and can send a prompt to the client that the transaction request fails in acceptance. Upon receiving the prompt, the client can present it to the user, such that the user re-edits the transaction request and sends it to the first blockchain node via the client.

Moreover, upon receiving a transaction request from a client, the first blockchain node can send the transaction request in a broadcasting form to all second blockchain nodes. The all second blockchain nodes herein may be blockchain nodes in the consensus network other than the first blockchain node. Upon receiving the transaction request, all second blockchain nodes can perform the second security verification on the transaction request to decide whether to store the transaction request, as shown in FIG. 2.

Figure 2:
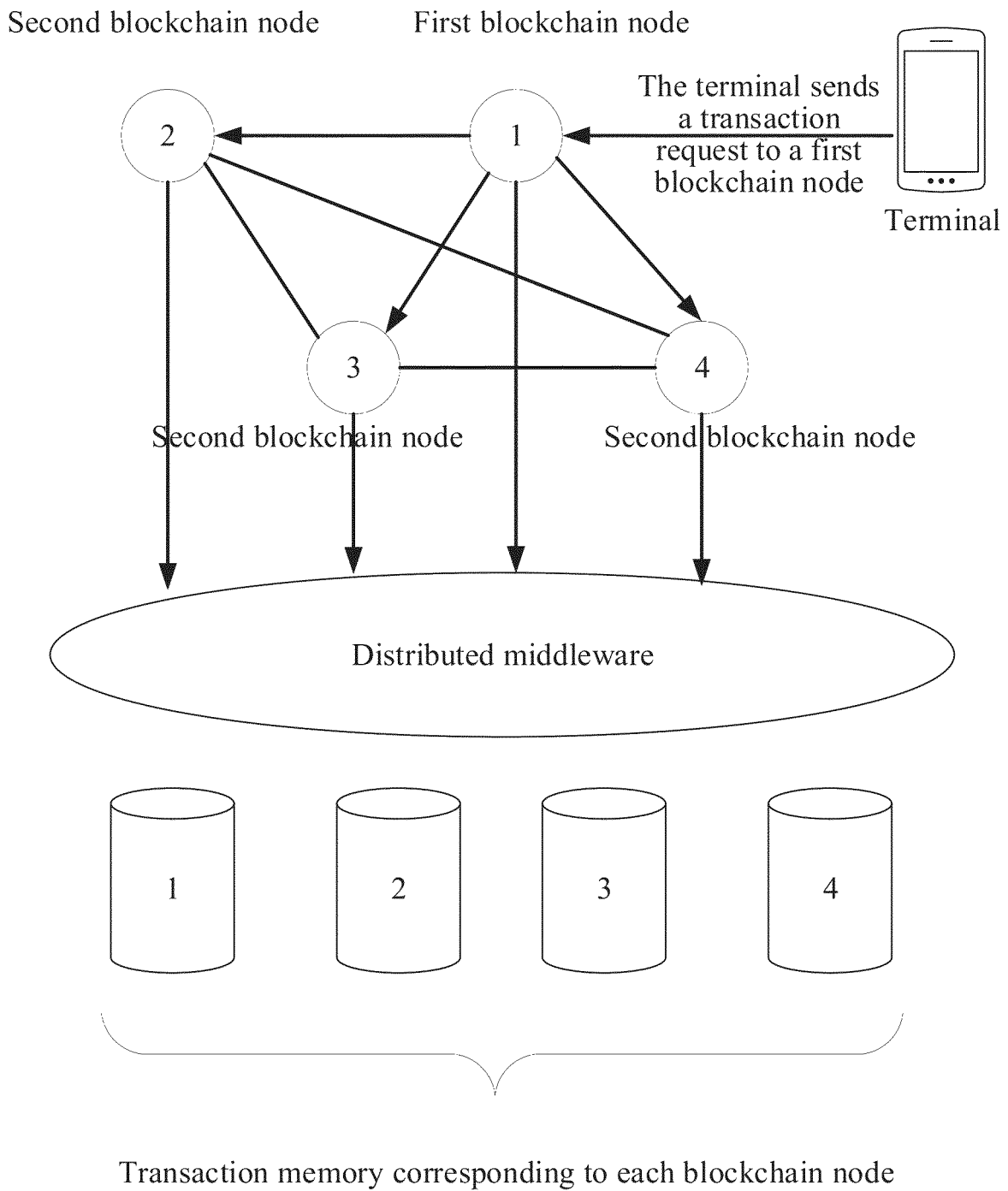
FIG. 2 is a schematic diagram of a detailed process of asymmetric signature legality verification performed by the entire consensus network on a transaction request according to an embodiment of the present disclosure

FIG. 2 is a schematic diagram of a detailed process of security verification performed by the entire consensus network on a transaction request according to an embodiment of the present disclosure.

With transaction transactions as an example, when a user needs to carry out a balance transfer transaction, a transfer object can be selected in a client installed on a terminal, and a transfer amount is input. According to the content input by the user, the client generates a corresponding transaction request and sends the transaction request into a first blockchain node, wherein the client can encrypt the transaction request with a private key held thereby and send the encrypted transaction request into the first blockchain node.

Upon receiving the transaction request from the client, the first blockchain node can decrypt the transaction request (e.g., by performing a first security verification on the transaction request) through the public key carried in the transaction request (the first blockchain node can acquire the public key from the client in advance) to obtain account addresses of the transaction parties involved in the transaction request, and then to verify whether the account addresses of the transaction parties are legal. When determining that the account addresses of the transaction parties involved in the transaction request are both legal accounts, and that the amount in the account of the transaction initiating party is greater than or equal to the transfer amount involved in the transaction request, the first blockchain node determines that the transaction request passes the first security verification and then stores the transaction request in a transaction memory corresponding to the first blockchain node. The storage of the transaction request by the first blockchain node in the transaction memory may be equivalent to accepting the transaction request. If the first blockchain node determines that the transaction request does not pass the first security verification, on the other hand, the first blockchain node refuses to accept the transaction request, namely does not store the transaction request in a transaction memory corresponding to itself.

Moreover, upon receiving the transaction request, the first blockchain node can send the transaction request in a broadcasting form to other blockchain nodes in the consensus network, e.g., all the second blockchain nodes. Upon receiving the transaction request, all second blockchain nodes can perform the second security verification on the transaction request. When determining that the transaction request passes the second security verification, each second blockchain node stores the transaction request in a transaction memory corresponding to itself to accept the transaction request; similarly, when determining that the transaction request does not pass the second security verification, the second blockchain node does not accept the transaction request.

In some embodiments, all blockchain nodes and all transaction memories in the consensus network can achieve data transmission via a preset piece of distributed middleware. For example, when determining that the transaction request passes the first security verification, the first blockchain node can send the transaction request to the distributed middleware, and the distributed middleware can send, according to the node identifier of the first blockchain node, the transaction request to the transaction memory corresponding to the first blockchain node for storage.

S103: performing pre-processing on at least one stored transaction request in response to determining that a preset condition is satisfied, to obtain and store a pre-processed block.

To simplify the process of consensus verification for blockchain transactions, shorten the time consumed in consensus verification, and improve the consensus verification efficiency, the first blockchain node performs pre-processing on transaction requests to obtain a pre-processed block before performing consensus verification on transaction requests stored in itself. As a result, the pre-processed block is directly broadcast, in the consensus verification process, to all second blockchain nodes in the consensus network for consensus verification.

In one example, when determining that a preset condition is satisfied, the first blockchain node can obtain at least one transaction request from the transaction memory corresponding to itself, and perform consensus on these transaction requests through the entire consensus network in a subsequent process.

Herein, when determining that the current moment reaches a set time period for obtaining a next transaction request, the first blockchain node determines that the request obtaining condition is satisfied, obtains at least one transaction request from the transaction memory corresponding to itself, and performs pre-processing on the obtained at least one transaction request. Moreover, the above preset condition may also be other conditions. For example, when monitoring and determining that a transaction request in the transaction memory reaches a set storage time, the first blockchain node determines that the transaction request satisfies the preset condition. Subsequently, the first blockchain node can perform pre-processing on all transaction requests that satisfy the preset condition and obtain corresponding pre-processed blocks. The preset condition herein may also be in other forms.

In the process of obtaining transaction requests from a transaction memory, the first blockchain node can obtain a plurality of transaction requests from the transaction memory corresponding to itself according to transaction type priorities. For example, the first blockchain node can set a transaction type as a boundary, and obtain all transaction requests with a transaction type priority above the boundary from the transaction memory.

When performing consensus on transaction requests through a consensus network, the first blockchain node can select a transaction and obtain all transaction requests corresponding to the transaction from the transaction memory, wherein the first blockchain node can select transactions randomly or in an order. Alternatively, the first blockchain node can obtain a plurality of transaction requests from the transaction memory in a temporal order in which the transaction requests enter the transaction memory. The first blockchain node can obtain transaction requests by following other criteria, which will not be described in detail herein.

After obtaining the transaction requests, the first blockchain node can determine, according to a preset characteristic value determination rule, a sub-characteristic value corresponding to each transaction request, respectively. For example, when the preset characteristic value determination rule is a Hash algorithm, the first blockchain node can determine a sub-Hash value corresponding to each transaction request, respectively. When the preset characteristic value determination rule is a Message Digest Algorithm (MD5), the first blockchain node can determine a sub-MD5 value corresponding to each transaction request, respectively.

After determining a sub-characteristic value corresponding to each transaction request, the first blockchain node can determine, according to an order of the determined sub-characteristic values and transaction requests, a to-be-verified characteristic value uniquely corresponding to the transaction requests.

Here, the to-be-verified characteristic value may uniquely correspond to the transaction requests as a whole. For example, when the content of one of the transaction requests changes, the to-be-verified characteristic value will change accordingly. The order of the transaction requests may be an order set by the first blockchain node, or may be determined according to the order of the transaction requests in the transaction memory. An exemplary manner in which the first blockchain node determines the to-be-verified characteristic value is shown in FIG. 3.

Figure 3:
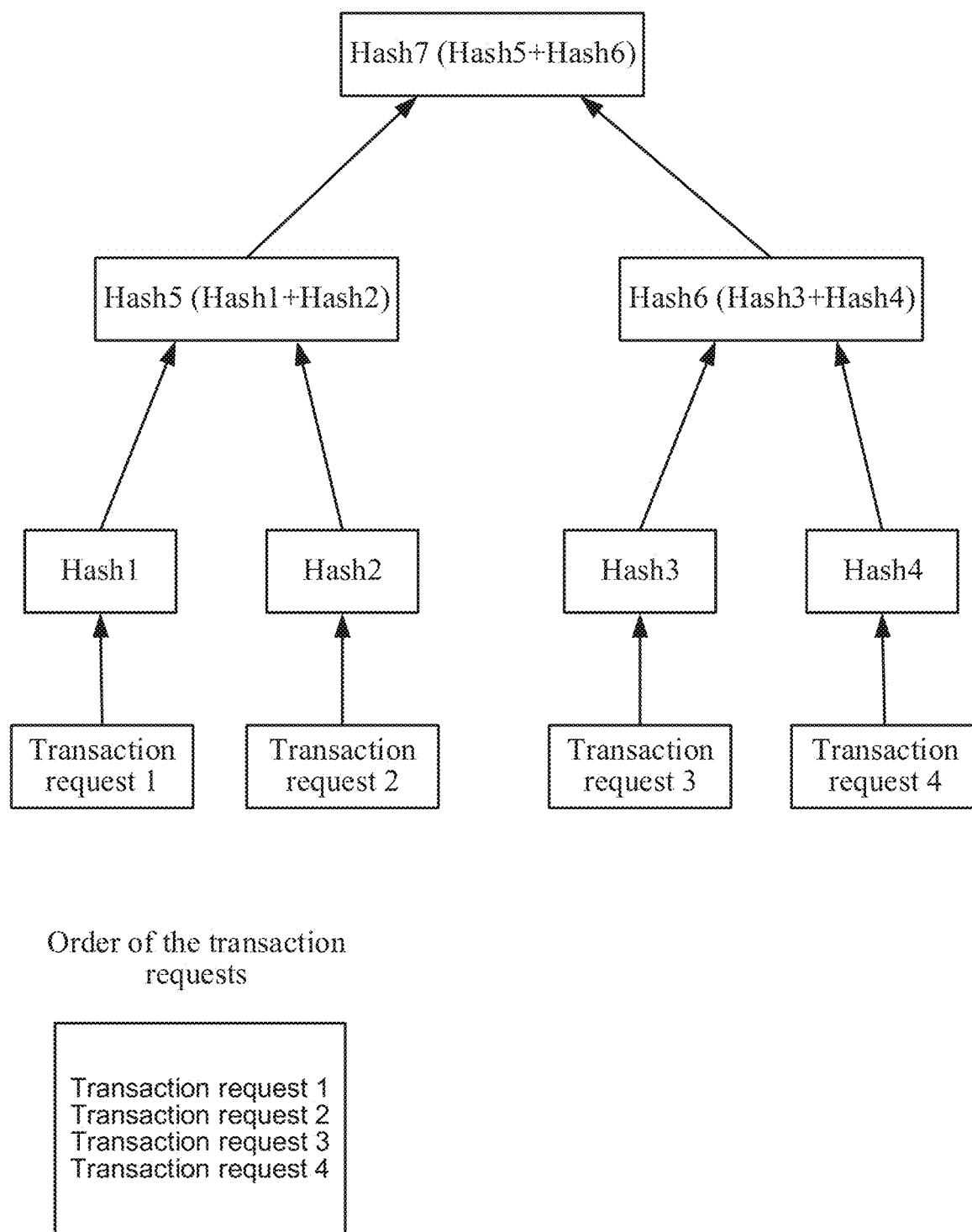
FIG. 3 is a schematic diagram of determining a to-be-verified characteristic value according to an embodiment of the present disclosure.

FIG. 3 is a schematic diagram of determining a to-be-verified characteristic value according to an embodiment of the present disclosure.

As shown in FIG. 3, in some embodiments, the characteristic value determination rule used by the first blockchain node includes a Hash algorithm. Assume that the first blockchain node obtains four transaction requests from all the transaction requests stored in itself, and these four transaction requests are arranged in an order shown in FIG. 3. After the first blockchain node determines four sub-Hash values corresponding to these four transaction requests, respectively, the four sub-Hash values (Hash1, Hash2, Hash3, Hash4) can be placed on four leaf nodes of an Merkle tree sequentially from left to right according to the order of these four transaction requests, and based on which non-leaf nodes (Hash5, Hash6) and the root node (Hash7) of the Merkle tree can be determined. Subsequently, the first blockchain node can determine the root node Hash7 of the Merkle tree to be a to-be-verified characteristic value uniquely corresponds to these four transaction requests.

The method to determine the to-be-verified characteristic value described above is not unique, and the first blockchain node may also use other manners, as long as it ensures that the to-be-verified characteristic value uniquely corresponds to all transaction requests in a certain order.

After determining the to-be-verified characteristic value uniquely corresponding to all transaction requests (e.g., the at least one transaction request obtained from the transaction memory), the first blockchain node can package the to-be-verified characteristic value and all transaction request identifiers (e.g., for a transaction transaction, a transaction transaction identifier could be a serial number of a transaction) corresponding to all the transaction requests into a pre-processed block, wherein the first blockchain node can sort all the transaction request identifiers in the above order of the transaction requests to obtain a transaction request identifier queue and store the transaction request identifier queue in the pre-processed block.

After determining the above pre-processed block, the first blockchain node can store the pre-processed block into a transaction memory corresponding to itself. When the consensus verification phase begins, the first blockchain node can obtain the pre-processed block from the transaction memory, and broadcast the pre-processed block to all second blockchain nodes in the consensus network for consensus verification, wherein the first blockchain node can mix the pre-processed block with all transaction requests for storage in the transaction memory corresponding to itself, or can divide a designated memory region in the transaction memory and store the pre-processed block in the designated memory region.

S104: broadcasting the obtained pre-processed block to the second blockchain nodes, causing the second blockchain nodes to perform consensus verification on the obtained pre-processed block.

In the consensus verification, the first blockchain node can obtain a pre-processed block from the pre-processed blocks corresponding to the previous pre-processing of all transaction requests and stored in itself, send, via broadcasting, the pre-processed block to other blockchain nodes (e.g., all second blockchain nodes) in the entire consensus network, and then perform consensus verification on all the transaction requests corresponding to the pre-processed block through the consensus network.

In one example, the first blockchain node can broadcast the above pre-processed block to all the second blockchain nodes in the consensus network. For each second blockchain node, on the other hand, the second blockchain node can resolve the pre-processed block upon receiving the pre-processed block from the first blockchain node, to determine transaction request identifiers of all transaction requests comprised in the pre-processed block.

The second blockchain nodes can further determine all transaction requests corresponding to the transaction request identifiers from all transaction requests stored in themselves, and determine, according to a preset characteristic value determination rule, a sub-characteristic value corresponding to each transaction request, respectively, wherein the characteristic value determination rule used by the second blockchain nodes may be the same as the one of the first blockchain node.

After determining a sub-characteristic value corresponding to each transaction request, the second blockchain nodes can determine, according to an order of the transaction request identifiers (e.g., the order of all the transaction request identifiers in the transaction request identifier queue) and all sub-characteristic values, a characteristic value uniquely corresponding to all the transaction requests as a whole, and then compare the characteristic value with the to-be-verified overall characteristic value in the pre-processed block. When these two characteristic values are identical, it can be determined that the contents of these transaction requests to be consensus-verified by the first blockchain node are not altered, namely it is determined that these transaction requests pass the Hash integrity verification, wherein the second blockchain nodes can determine the order of all the transaction request identifiers according to the order of all the transaction request identifiers comprised in the pre-processed block.

Each second blockchain node can perform the Hash integrity verification on the above pre-processed block according to the above method, and obtain respective verification result regarding the pre-processed block. Subsequently, each second blockchain node can send the respectively obtained verification result in a broadcasting form to other blockchain nodes in the consensus network. Upon receiving each mutually broadcast verification result, each blockchain node in the consensus network can obtain, according to the received verification results and its own verification result, a comprehensive verification result regarding whether the pre-processed block passes verification by all blockchain nodes in the consensus network, and broadcast the obtained comprehensive verification result to other blockchain nodes in the entire consensus network again.

Upon receiving the mutually broadcast comprehensive verification result, each blockchain node in the consensus network can further determine whether most of the comprehensive verification results obtained by all blockchain nodes in the entire consensus network are that the verification is passed. If yes, the blockchain node writes transaction requests corresponding to the transaction request identifiers comprised in the pre-processed block into a block for storage, and further writes the block into the blockchain stored in itself according to the temporal order; if no, the blockchain node determines that the transaction requests corresponding to the pre-processed block do not pass the consensus verification by the consensus network and refuses to write the transaction requests into the blockchain.

After the blockchain node (the blockchain node herein may be a first blockchain node or a second blockchain node) stores all the transaction requests in the form of a block in the blockchain, the storage space occupied by these transaction requests in their respective transaction memories can be released, and these transaction requests are transferred to a database for storing historical transaction requests.

From the above method, it can be seen that, upon receiving a transaction request from a client, a first blockchain node may perform a first security verification on the transaction request, and after determining that the transaction request passes the first security verification, store the transaction request. Subsequently, the first blockchain node may perform pre-processing on at least one transaction request of its own to obtain a pre-processed block, and store the pre-processed block. As a result, in the process of carrying out consensus verification, the first blockchain node may directly obtain a pre-processed block obtained previously before the consensus verification phase, and broadcast the pre-processed block to other blockchain nodes in the consensus network for consensus verification, which greatly simplifies the process in the consensus verification phase, shortens the time consumed in the consensus verification phase, and thus improves the consensus verification efficiency of blockchain nodes, and improves the consensus verification efficiency for blockchain transactions.

In some embodiments, to further improve the consensus verification efficiency for blockchain transactions, all blockchain nodes in the consensus network (e.g., the first blockchain node and all second blockchain nodes) may also receive, store, verify, and pre-process the above transaction requests via a server cluster. In other words, a blockchain node may consists of an individual device in the prior art, but in the present disclosure, the blockchain node may comprise a server cluster. All servers in the server cluster may have the same hierarchy level, or may be provided to particularly process designated tasks, while all servers in the server cluster share the same node configuration. For example, all servers can share one node identity (ID), point to point routing table, a node's asymmetric public and private keys, and other node configuration. From an external point of view, therefore, all actions and instructions sent by the servers in the server cluster can be seen as from one blockchain node. A schematic diagram of a server cluster is shown in the following figure.

Figure 4:
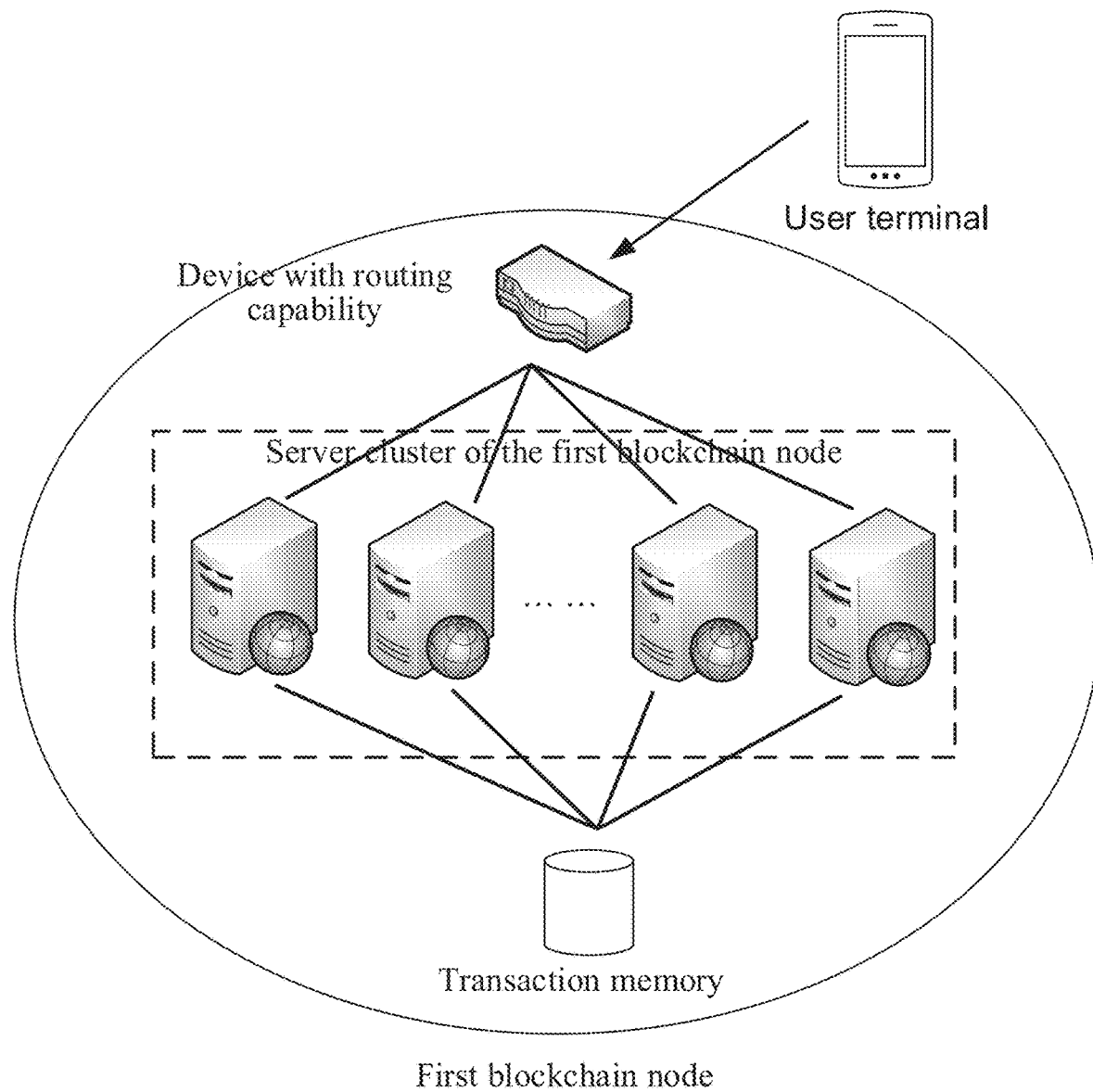
FIG. 4 is a schematic diagram of a server cluster according to an embodiment of the present disclosure.

FIG. 4 is a schematic diagram of a server cluster according to an embodiment of the present disclosure. FIG. 4 illustrates a server cluster architecture of a first blockchain node. There is a device with routing capability in the server cluster. The device with routing capability is responsible for distributing transaction requests from a user terminal to a server in the server cluster. Here, the device with routing capability can distribute the transaction requests in a random manner to a server in the server cluster, or can distribute the transaction requests in a load balancing manner to servers in the server cluster. Therefore, the device with routing capability may also be a load balancing device. Upon receiving the transaction request, the server in the server cluster can perform a first security verification on the transaction request, and after determining that the transaction request passes the first security verification, store the transaction request in a transaction memory corresponding to the first blockchain node, wherein the server cluster of the first blockchain node can correspond to a transaction memory. The servers in the server cluster can each correspond to a transaction memory, and at this moment, the first blockchain node will correspond to a plurality of transaction memories.

A server in the server cluster can obtain a plurality of transaction requests from the transaction memory, and perform pre-processing on the transaction requests to obtain a pre-processed block. Subsequently, the server can store the obtained pre-processed block in a transaction memory corresponding to the first blockchain node for use in subsequent consensus verification, wherein the server may be a server selected previously by the load balancing device for receiving transaction requests from a client (or a server selected by the device with routing capability), or may be a server re-selected from a plurality of servers comprised in the first blockchain node.

In some embodiments, when a server in the server cluster obtains a plurality of transaction requests from the above transaction memory, it can directly transfer these transaction requests into the server for pre-processing. In this way, other servers in the server cluster will not be able to obtain these transaction requests from the transaction memory, thereby avoiding the situation in which these transaction requests are subject to repeated pre-processing by servers in the server cluster.

In the process that a server in the server cluster obtains these transaction requests, the server can mark these transaction requests in a transaction memory. In this way, other servers in the server cluster will not perform pre-processing on the transaction requests once they detect the marked transaction requests in the transaction memory. Moreover, server in the server cluster may also dispose the situation in which transaction requests are subject to repeated pre-processing by servers in the server cluster in other manners.

In the consensus verification, a server in the server cluster can obtain a pre-processed block obtained from previous pre-processing of all transaction requests from a transaction memory corresponding to the first blockchain node, and send the pre-processed block to other blockchain nodes (e.g., all second blockchain nodes) in the entire consensus network via a gateway. Upon receiving the pre-processed block, the second blockchain nodes can distribute the pre-processed block to one server in their own server clusters via respective load balancing devices (or a device with routing capability), and perform consensus verification on the pre-processed block via the server.

Here, the server that obtains the above pre-processed block from a transaction memory may be any server in the server cluster. The server selection may be decided by a load balancing device in a load balancing manner (or selected by a device with routing capability), or may be decided by a designated server in the server cluster. Alternatively, each server in the server cluster may be provided with a consensus period, and different servers have different consensus periods. In other words, the consensus periods of different servers are staggered in time. For each server in the server cluster, the server can automatically obtain a previously obtained pre-processed block from a transaction memory corresponding to the first blockchain node every time when a period (e.g., a consensus period corresponding to itself) is passed, and broadcast the pre-processed block to all second blockchain nodes in the consensus network via a gateway. Moreover, the work to obtain a pre-processed block may also be done by a designated server in the server cluster, while other servers do not participate in the work to obtain a pre-processed block.

As seen in the figures, in some embodiments, the server cluster may be equivalent to the first blockchain node. Since the number of servers of the first blockchain node is changed from a single server to a mode of a server cluster, the pressure on servers and the transaction processing efficiency are both significantly improved, which provides an effective solution to increased transaction pressure as a result of the subsequent increase of the users.

In some embodiments, as shown in FIG. 4, a designated task can be completed by selecting a server from a plurality of servers comprised in the first blockchain node via a device with routing capability (or a load balancing device), and moreover, can be implemented in a form like gateway. If a server is selected via a gateway, the gateway can select a server from the plurality of servers comprised in the first blockchain node in a load balancing manner to complete a designated task. Random selection or an alternative implementation can be used to select a server.

After the server selected by the above device with routing capability (or a load balancing device) receives a transaction request from a client, the device with routing capability can select, once again, a server from a plurality of servers comprised in the first blockchain node for storing the transaction request, send the transaction request to the server selected for storing the transaction request via the server that receives the transaction request, and then store the transaction request via the server. The first blockchain node can use the same manner when performing pre-processing on a transaction request via a server selected by the device with routing capability (or a load balancing device). Namely, after a selected server completes pre-processing on a transaction request, the device with routing capability can re-determine a server from the plurality of servers comprised in the first blockchain node, and notify the server that completes pre-processing on the transaction request to send the obtained pre-processed block to the re-determined server, to store the pre-processed block in a transaction memory comprised in the first blockchain node via the re-determined server.

As shown in FIG. 4, a server cluster of the first blockchain node is used as an example to describe how the server cluster works in blockchain transactions, while server clusters of all the second blockchain nodes in the consensus network may be the same as the server cluster described above, and some processing processes are similar to those of the above server cluster of the first blockchain node, which will not be repeated in detail herein.

In some embodiments, the entire consensus network may be an alliance chain, while each blockchain node may be a blockchain node in the alliance chain.

The method for consensus verification according to some embodiments of the present disclosure is described above. On the basis of the same concept, embodiments of the present disclosure further provide two apparatuses for consensus verification as shown in FIGS. 5 and 6.

Figure 5:
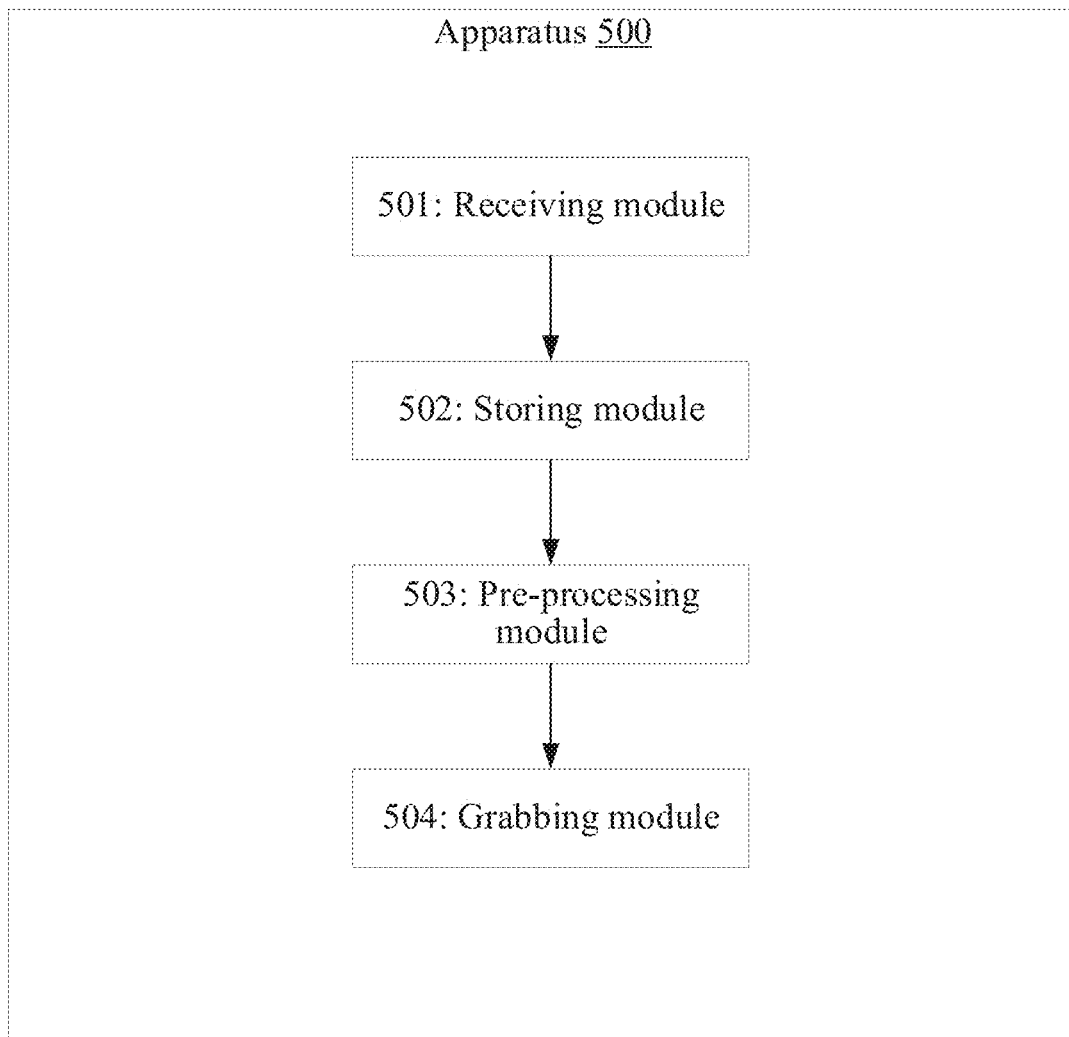
FIG. 5 is a schematic diagram of an apparatus for consensus verification according to an embodiment of the present disclosure.
Figure 6:
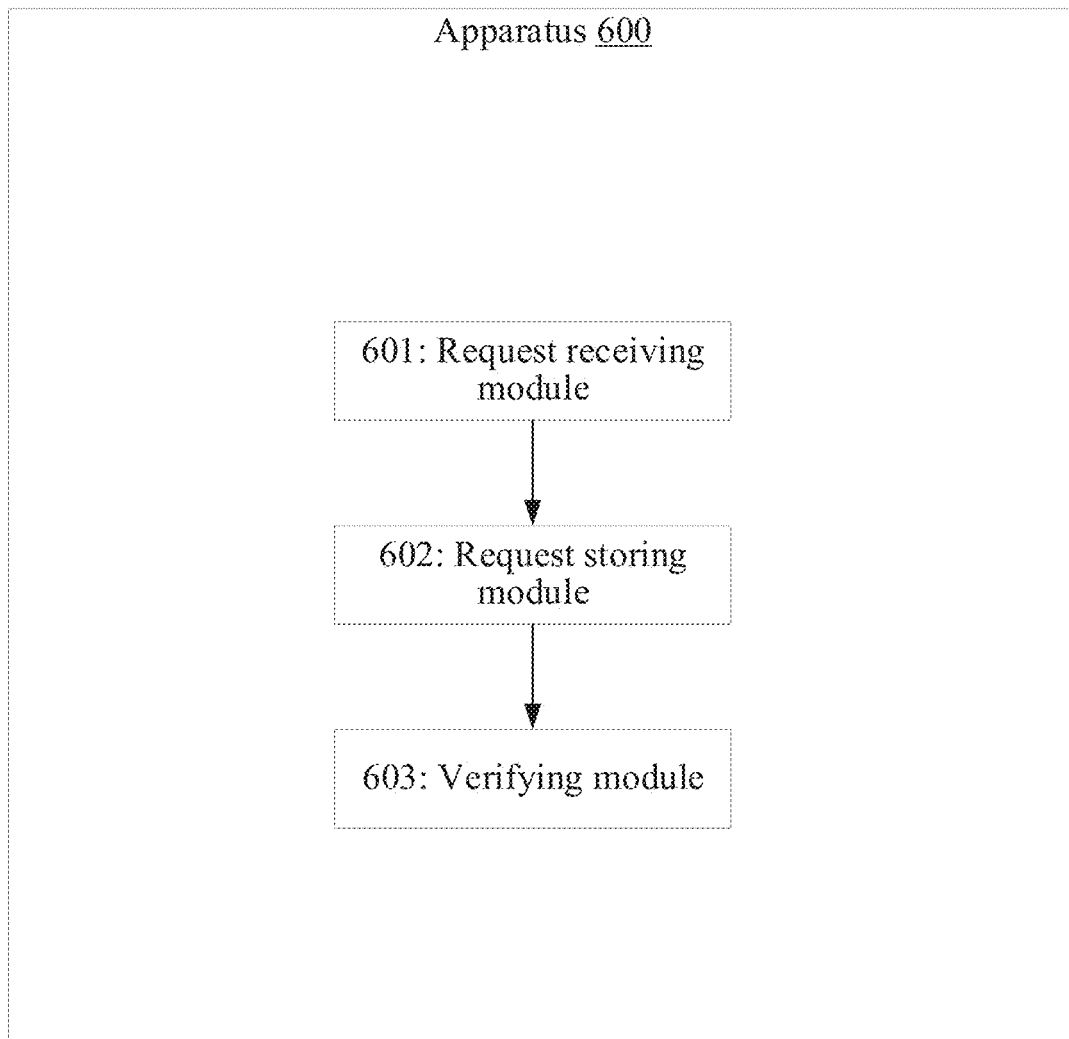
FIG. 6 is a schematic diagram of another apparatus for consensus verification according to an embodiment of the present disclosure.

FIG. 5 is a schematic diagram of an apparatus 500 for consensus verification according to an embodiment of the present disclosure. The apparatus 500 may be in a consensus network (e.g., as a first blockchain node in a consensus network) and may be implemented as software, hardware, or a combination of both. In one example, the apparatus 500 may comprise a memory and a processor coupled together. The memory may be non-transitory and computer-readable. The memory may store instructions that, when executed by the processor, cause the apparatus 500 to perform one or more steps described herein. In some embodiments, the instructions may be implemented as various software modules. Such modules may comprise: a receiving module 501 configured to receive a transaction request from a terminal and perform a first security verification on the transaction request; a storing module 502 configured to store, when determining that the transaction request passes the first security verification, the transaction request, and broadcast the transaction request to each second blockchain nodes in the consensus network, such that the each second blockchain node stores the transaction request when determining that the transaction request passes a second security verification; a pre-processing module 503 configured to perform pre-processing on at least one stored transaction request when determining that a preset condition is satisfied, to obtain and store a pre-processed block; an obtaining module 504 configured to broadcast the obtained pre-processed block to the second blockchain nodes, causing the second blockchain nodes to perform consensus verification on the obtained pre-processed block.

The first security verification comprises: asymmetric signature legality verification.

In some embodiments, the storing module 502 may not store the transaction request, when determining that the transaction request fails the first security verification.

The pre-processing module 503 may determine that the preset condition is satisfied, when monitoring that a set time period is passed.

The pre-processing module 503 may determine, according to a preset characteristic value determination rule, a to-be-verified characteristic value corresponding to the at least one transaction request; and package all transaction request identifiers corresponding to the at least one transaction request and the to-be-verified characteristic value into a pre-processed block.

FIG. 6 is a schematic diagram of another apparatus 600 for consensus verification according to an embodiment of the present disclosure. The apparatus 600 may be in a consensus network (e.g., as a second blockchain node in a consensus network) and may be implemented as software, hardware, or a combination of both. In one example, the apparatus 600 may comprise a memory and a processor coupled together. The memory may be non-transitory and computer-readable. The memory may store instructions that, when executed by the processor, cause the apparatus 600 to perform one or more steps described herein. In some embodiments, the instructions may be implemented as various software modules. Such modules may comprise: a request receiving module 601 configured to receive a transaction request broadcast by a first blockchain node and perform a second security verification on the transaction request; a request storing module 602 configured to store, when determining that the transaction request passes the second security verification, the transaction request; a verifying module 603 configured to perform consensus verification, when receiving a pre-processed block broadcast by the first blockchain node, on the pre-processed block.

The second security verification comprises: asymmetric signature legality verification.

In some embodiments, the request storing module 602 may not store the transaction request, when determining that the transaction request fails the second security verification.

The verifying module 603 may search, when receiving the pre-processed block broadcast by the first blockchain node, all transaction requests stored in itself for transaction requests corresponding to all the transaction request identifiers comprised in the pre-processed block, and determine, according to a preset characteristic value determination rule, a characteristic value corresponding to each transaction request; perform consensus verification, via the characteristic value, on the to-be-verified characteristic value comprised in the pre-processed block.

In some embodiments, upon receiving a transaction request from a client, a first blockchain node may perform a first security verification on the transaction request, and after determining that the transaction request passes the first security verification, store the transaction request in itself. Subsequently, the first blockchain node may perform pre-processing on at least one transaction request among all transaction requests stored in itself to obtain a pre-processed block, and store the pre-processed block. As a result, in the process of carrying out consensus verification, the first blockchain node may obtain a pre-processed block directly from all stored pre-processed blocks, and broadcast the pre-processed block to other blockchain nodes in the consensus network for consensus verification, which greatly simplifies the process in the consensus verification phase, shortens the time consumed in consensus verification, and thus improves the consensus verification efficiency for blockchain transactions.

In the 1990s, an improvement to a technology could be differentiated into a hardware improvement (e.g. an improvement to a circuit structure, such as a diode, a transistor, a switch, and the like) or a software improvement (an improvement to a flow of a method). Along with the technological development, however, many current improvements to method flows can be deemed as direct improvements to hardware circuit structures. Designers can obtain a corresponding hardware circuit structure by programming an improved method flow into a hardware circuit. Therefore, an improvement to a method flow can be realized by hardware implementation. For example, Programmable Logic Device (PLD) (e.g., Field Programmable Gate Array (FPGA)) is such an integrated circuit that its logic functions are determined by a user through programming the device. A designer can program to "integrate" a digital system onto one piece of PLD, without asking a chip manufacturer to design and manufacture a dedicated IC chip. At present, this type of programming has mostly been implemented through "logic compiler" software, rather than manually manufacturing the IC chips. The logic compiler software is similar to a software compiler used for program development and writing, while a particular programming language is used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language). The most commonly used HDL includes VHDL (Very-High-Speed Integrated Circuit Hardware Description Language) and Verilog. A person skilled in the art would have known obtaining a hardware circuit to implement a logic method flow by using the above HDLs to perform some logic programming on the method flow and program it into an IC.

A controller may be implemented in any proper manner. For example, a controller may be in, for example, a form of a microprocessor or processor, as well as a computer readable medium that stores computer readable program codes (e.g. software or firmware) capable of being executed by the (micro) processor, a logic gate, a switch, an Application Specific Integrated Circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. A memory controller may further be implemented as a part of a control logic of a memory. A person skilled in the art should also be aware that, in addition to that a controller is implemented in a manner of pure computer readable program codes, it is feasible to perform logic programming on steps of a method to enable a controller to implement the same functions in a form of a logic gate, a switch, an ASIC, a programmable logic controller and an embedded microcontroller. Therefore, such a controller can be deemed as a hardware part, while devices comprised therein and configured to carry out various functions may also be deemed as a structure inside the hardware part. Alternatively, devices configured to carry out various functions may be deemed as both software modules to implement a method and a structure inside a hardware part.

The system, apparatus, module or unit described in the above embodiments may be implemented by a computer chip or entity or implemented by a product having a function. A typical implementation device is a computer. For example, a computer may be a personal computer, a laptop computer, a cellular phone, a camera phone, a smart phone, a personal digital assistant, a medium player, a navigation device, an email apparatus, a game console, a tablet computer, a wearable device or a combination of any devices in these devices.

For convenience of description, the above apparatus is divided into various units according to functions for description. Functions of the units may be implemented in one or multiple pieces of software and/or hardware when implementing the present disclosure.

A person skilled in the art should understand that the embodiments of the present disclosure may be provided as a method, a system, or a computer program product. Therefore, the disclosed system may be implemented as a complete hardware embodiment, a complete software embodiment, or an embodiment combing software and hardware for performing the disclosed methods. Moreover, the disclosed system may be in the form of a computer program product implemented on one or more computer usable storage media (including, but not limited to, a magnetic disk memory, CD-ROM, an optical memory, and the like) comprising computer usable program codes therein.

The disclosed system is described with reference to flowcharts and/or block diagrams of the method, device (system) and computer program product according to the embodiments of the present disclosure. It should be understood that a computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, so that the instructions executed by a computer or a processor of other programmable data processing devices generate an apparatus for implementing a specified function in one or more processes in the flowcharts and/or in one or more blocks in the block diagrams.

These computer program instructions may also be stored in a computer readable memory that can instruct a computer or other programmable data processing devices to work in a particular manner, such that the instructions stored in the computer readable memory generate a manufactured article that includes an instruction apparatus. The instruction apparatus implements one or more functions in one or more processes in the flowcharts and/or in one or more blocks in the block diagrams.

These computer program instructions may also be loaded onto a computer or other programmable data processing devices, such that a series of operational steps are performed on the computer or other programmable devices, thereby generating computer-implemented processing. Therefore, the instructions executed on the computer or other programmable devices provide steps for implementing one or more functions in one or more processes in the flowcharts and/or in one or more blocks in the block diagrams.

In a typical configuration, the computation device includes one or more Central Processing Units (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

It should be further noted that the terms of "including", "comprising" or any other variants thereof intend to encompass a non-exclusive inclusion, such that a process, method, commodity or device comprising a series of elements not only comprises these elements, but also comprises other elements that are not listed, or further comprises elements that are inherent to the process, method, commodity or device. When there is no further restriction, elements defined by the statement "comprising one . . . " does not exclude additional similar elements in a process, method, commodity or device that comprises the defined elements.

A person skilled in the art should understand that the embodiments of the present disclosure may be provided as a method, a system, or a computer program product. Therefore, the present disclosure may be implemented as a complete hardware embodiment, a complete software embodiment, or an embodiment combing software and hardware. Moreover, the present disclosure may be in the form of a computer program product implemented on one or more computer usable storage media (including, but not limited to, a magnetic disk memory, CD-ROM, an optical memory, and the like) comprising computer usable program codes therein.

The present disclosure may be described in a regular context of a computer executable instruction that is executed by a computer, such as a program module. In various embodiments, the program module comprises a routine, a program, an object, a component, a data structure, and the like for executing a particular task or implementing a particular abstract data type. The present disclosure may also be practiced in distributed computing environments. In these distributed computing environments, remote processing devices connected via communication networks carry out tasks. In the distributed computing environments, a program module can be located in local and remote computer storage media, including storage devices.

The embodiments in this description are described in a progressive manner with each embodiment focusing on differences from other embodiments, and the embodiments may be mutually referenced for identical or similar parts thereof. For the system embodiment, the description thereof is relatively simple as it is substantially similar to the method embodiment. The description of the method embodiment may be referenced for related parts thereof.

The embodiments of the present disclosure are merely exemplary, and are not used to limit the present disclosure. To a person skilled in the art, the disclosed embodiments can be modified or changed in various ways. Any modification, equivalent substitution or improvement made within the spirit and principle of the present disclosure shall be encompassed by the claims of the present disclosure.

The invention claimed is:

1. One or more non-transitory computer-readable storage media storing instructions that, when executed by one or more processors, cause the one or more processors to perform operations comprising:
before a consensus verification phase begins:
receiving, by a load-balancing device, a blockchain transaction from a client, wherein a first blockchain node of a consensus network comprises the load-balancing device, a plurality of servers, and a transaction memory, and the load-balancing device is coupled to each of the plurality of servers;
distributing, by the load-balancing device, the blockchain transaction to a first server of the plurality of servers according to load balancing among the plurality of servers;
performing, by the first server, a first security verification on the blockchain transaction before accepting the first blockchain transaction, wherein the first security verification comprises an asymmetric signature legality verification;
in response to the first server determining that the blockchain transaction passes the first security verification:
storing, by the first blockchain node, the blockchain transaction into the transaction memory; and
broadcasting, via the consensus network by the first blockchain node, the blockchain transaction to each of a plurality of second blockchain nodes of the consensus network, causing each of the second blockchain nodes to store the blockchain transaction in a memory corresponding to the each second blockchain node in response to the each second blockchain node determining that the blockchain transaction passes a second security verification, wherein the second security verification comprises the asymmetric signature legality verification;
in response to determining that a preset condition is satisfied, generating, by a second server of the plurality of servers, a pre-processed data block comprising a unique characteristic value, wherein the pre-processed data block comprises a queue of a plurality of identifiers of a plurality of blockchain transactions including an identifier of the blockchain transaction, and the unique characteristic value corresponds to an order of the queue; and
during a consensus verification phase:
selecting, by the load-balancing device, a third server according to load balancing among the plurality of servers; and
broadcasting, via the consensus network by the third server of the plurality of servers, the pre-processed block comprising the unique characteristic value to at least one of the plurality of second blockchain nodes, causing the at least one second blockchain node to verify the unique characteristic value based at least on the plurality of identifiers, including the identifier of the blockchain transaction that has passed the second security verification and has been stored in the at least one second blockchain node before the consensus verification phase began.

2. The non-transitory computer-readable storage medium of claim 1, wherein performing the first security verification on the blockchain transaction comprises:
obtaining a public key of a public-private key pair of a user associated with the client, wherein the blockchain transaction is encrypted with a private key of the public-private key pair;
obtaining decrypted information of the blockchain transaction by decrypting the blockchain transaction with the public key; and
verifying the decrypted information of the blockchain transaction.

3. The non-transitory computer-readable storage medium of claim 1, wherein the load-balancing device is a routing device.

4. The non-transitory computer-readable storage medium of claim 1, wherein:
generating the unique characteristic value of the pre-processed data block comprises:
determining a plurality of sub-hash values of the plurality of blockchain transactions comprising the blockchain transaction according to a hash algorithm; and
generating a hash value according to the order, the unique characteristic value of the pre-processed data block comprising the hash value; and generating the pre-processed data block comprises:
packaging the generated hash value and the queue of the plurality of identifiers in the order into the pre-processed data block.

5. The non-transitory computer-readable storage medium of claim 1, wherein generating the pre-processed data block comprises: transferring the plurality of blockchain transactions to the second server for generating the pre-processed data block, or marking the plurality of blockchain transactions in the transaction memory before generating the pre-processed data block.

6. The non-transitory computer-readable storage medium of claim 1, wherein the plurality of servers are coupled to the transaction memory.

7. The non-transitory computer-readable storage medium of claim 6, wherein before broadcasting the pre-processed block, the operations further comprise retrieving, by the third server, the pre-processed block from the transaction memory.

8. The non-transitory computer-readable storage medium of claim 7, wherein the plurality of servers are respectively assigned a plurality of consensus periods staggered in time, and broadcasting the pre-processed block comprises broadcasting, by the third server, the pre-processed block during a consensus period assigned to the third server.

9. The non-transitory computer-readable storage medium of claim 1, wherein the third server is a designated server among the plurality of servers.

10. A method, comprising:
before a consensus verification phase begins:
receiving, by a load-balancing device, a blockchain transaction from a client, wherein a first blockchain node of a consensus network comprises the load-balancing device, a plurality of servers, and a transaction memory, and the load-balancing device is coupled to each of the plurality of servers;
distributing, by the load-balancing device, the blockchain transaction to a first server of the plurality of servers according to load balancing among the plurality of servers;
performing, by the first server, a first security verification on the blockchain transaction before accepting the first blockchain transaction, wherein the first security verification comprises an asymmetric signature legality verification;
in response to the first server determining that the blockchain transaction passes the first security verification:
storing, by the first blockchain node, the blockchain transaction into the transaction memory; and
broadcasting, via the consensus network by the first blockchain node, the blockchain transaction to each of a plurality of second blockchain nodes of the consensus network, causing each of the second blockchain nodes to store the blockchain transaction in a memory corresponding to the each second blockchain node in response to the each second blockchain node determining that the blockchain transaction passes a second security verification, wherein the second security verification comprises the asymmetric signature legality verification;
in response to determining that a preset condition is satisfied, generating, by a second server of the plurality of servers, a pre-processed data block comprising a unique characteristic value, wherein the pre-processed data block comprises a queue of a plurality of identifiers of a plurality of blockchain transactions including an identifier of the blockchain transaction, and the unique characteristic value corresponds to an order of the queue; and
during a consensus verification phase:
selecting, by the load-balancing device, a third server according to load balancing among the plurality of servers; and
broadcasting, via the consensus network by the third server of the plurality of servers, the pre-processed block comprising the unique characteristic value to at least one of the plurality of second blockchain nodes, causing the at least one second blockchain node to verify the unique characteristic value based at least on the plurality of identifiers, including the identifier of the blockchain transaction that has passed the second security verification and has been stored in the at least one second blockchain node before the consensus verification phase began.

11. The method of claim 10, wherein performing the first security verification on the blockchain transaction comprises:
obtaining a public key of a public-private key pair of a user associated with the client, wherein the blockchain transaction is encrypted with a private key of the public-private key pair;
obtaining decrypted information of the blockchain transaction by decrypting the blockchain transaction with the public key; and
verifying the decrypted information of the blockchain transaction.

12. The method of claim 10, wherein the load-balancing device is a routing device.

13. The method of claim 10, wherein:
generating the unique characteristic value of the pre-processed data block comprises:
determining a plurality of sub-hash values of the plurality of blockchain transactions comprising the blockchain transaction according to a hash algorithm; and
generating a hash value according to the order, the unique characteristic value of the pre-processed data block comprising the hash value; and
generating the pre-processed data block comprises:
packaging the generated hash value and the queue of the plurality of identifiers in the order into the pre-processed data block.

14. The method of claim 10, wherein the plurality of servers are coupled to the transaction memory.

15. The method of claim 14, before broadcasting the pre-processed block, further comprising retrieving, by the third server, the pre-processed block from the transaction memory.

16. The method of claim 10, wherein:
the plurality of servers are respectively assigned a plurality of consensus periods staggered in time, and broadcasting the pre-processed block comprises broadcasting, by the third server, the pre-processed block during a consensus period assigned to the third server.

17. A system associated with a first blockchain node of a consensus network, the system comprising a load-balancing device, a plurality of servers, and a transaction memory, wherein:

before a consensus verification phase begins:
- the load-balancing device is configured to receive a blockchain transaction from a client, wherein the load-balancing device is coupled to each of the plurality of servers;
- the load-balancing device is configured to distribute the blockchain transaction to a first server of the plurality of servers according to load balancing among the plurality of servers;
- the first server is configured to perform a first security verification on the blockchain transaction before accepting the first blockchain transaction, wherein the first security verification comprises an asymmetric signature legality verification;
- in response to the first server determining that the blockchain transaction passes the first security verification:
    - the first blockchain node is configured to store the blockchain transaction into the transaction memory; and
    - the first blockchain node is configured to broadcast, via the consensus network, the blockchain transaction to each of a plurality of second blockchain nodes of the consensus network, causing each of the second blockchain nodes to store the blockchain transaction in a memory corresponding to the each second blockchain node in response to the each second blockchain node determining that the blockchain transaction passes a second security verification, wherein the second security verification comprises the asymmetric signature legality verification;
- in response to determining that a preset condition is satisfied, a second server of the plurality of servers is configured to generate a pre-processed data block comprising a unique characteristic value, wherein the pre-processed data block comprises a queue of a plurality of identifiers of a plurality of blockchain transactions including an identifier of the blockchain transaction, and the unique characteristic value corresponds to an order of the queue; and during a consensus verification phase:
- the load-balancing device is configured to select a third server according to load balancing among the plurality of servers; and
- the third server of the plurality of servers is configured to broadcast, via the consensus network, the pre-processed block comprising the unique characteristic value to at least one of the plurality of second blockchain nodes, causing the at least one second blockchain node to verify the unique characteristic value based at least on the plurality of identifiers, including the identifier of the blockchain transaction that has passed the second security verification and has been stored in the at least one second blockchain node before the consensus verification phase began.

* * * * *